United States Patent [19]
Jeon et al.

[11] Patent Number: 6,014,178
[45] Date of Patent: Jan. 11, 2000

[54] RECEIVER HAVING ANALOG AND DIGITAL VIDEO MODES AND RECEIVING METHOD THEREOF

[75] Inventors: Byeungwoo Jeon, Seongnam; Dong-il Song, Suwon, both of Rep. of Korea

[73] Assignee: Samsung Electronics Co., Ltd., Kyungki-do, Rep. of Korea

[21] Appl. No.: 09/235,402

[22] Filed: Jan. 22, 1998

Related U.S. Application Data

[62] Division of application No. 08/719,626, Sep. 25, 1996, Pat. No. 5,926,228.

[30] Foreign Application Priority Data

Sep. 29, 1995 [KR] Rep. of Korea ....................... 95-32893

[51] Int. Cl.7 ...................................................... H04N 5/46
[52] U.S. Cl. .......................... 348/554; 348/555; 348/557; 348/706
[58] Field of Search .................................... 348/553, 555, 348/554, 557, 558, 705, 706, 725, 728; H04N 5/46, 5/44

[56] References Cited

U.S. PATENT DOCUMENTS

| | | | |
|---|---|---|---|
| 5,257,106 | 10/1993 | Maruoba | 348/706 |
| 5,488,300 | 1/1996 | Yamada | 348/705 |
| 5,675,390 | 10/1997 | Schindler | 348/725 |

*Primary Examiner*—Sherrie Hsia
*Attorney, Agent, or Firm*—Sughrue, Mion, Zinn, Macpeak & Seas, PLLC

[57] ABSTRACT

In a receiver having both an analog video service mode and a digital video mode, when the analog video mode is selected according to a mode selection signal indicating that a television channel is for the analog video mode or the digital video mode, a large-capacity memory used for the digital video-decoding may also be used as a frame memory for Y/C separation and post-processing, for enhancing picture quality, improving the efficiency of the memory and reducing the cost of a system.

10 Claims, 12 Drawing Sheets ns and digital video modes and a receiving method therefor, and more particularly, to a receiver sharing a memory for digital television signal processing in an analog video mode, and to a receiving method therefor.

RECEIVER HAVING ANALOG AND DIGITAL VIDEO MODES AND RECEIVING METHOD THEREOF

This is a division of Application No. 08/719,626 filed Sep. 25, 1996, now U.S. Pat. No. 5,926,228.

BACKGROUND OF THE INVENTION

The present invention relates to a receiver having analog and digital video modes and a receiving method therefor, and more particularly, to a receiver sharing a memory for digital television signal processing in an analog video mode, and to a receiving method therefor.

The digital video mode is to receive television signals, digitally processed by the MPEG (Moving Picture Experts Group) standards from a transmitter such as a broadcasting station, and the analog video mode is to receive signals analog-processed by a conventional broadcasting method such as NTSC, PAL or SECAM. While a set-top-box for decoding a bitstream coded by MPEG-2, or a digital television including a set-top-box are being developed, conventional analog video service is still overwhelmingly predominant. In answer to this situation, a television receiver having both analog and digital video modes is needed. Such an analog and digital video mode television receiver requires 8–32 Mb of memory for digital television signal decoding. This memory, however, is idle (i.e., unused) when the analog video mode is selected.

In an analog receiver having an analog video mode, as shown in FIG. 1, a tuner 11 selects a desired television channel signal among received analog television channel signals, to output an intermediate frequency signal. A channel demodulator 12 amplifies and demodulates the intermediate frequency signal of the channel selected by tuner 11. (While the amplified and demodulated signal is separated into audio and video signals, only the video portion will be described for the sake of simplifying the drawings and description.) A luminance/chrominance (Y/C) separator 13 separates the video signal output from channel demodulator 12 into luminance (Y) and chrominance (C) signals, using a correlation between a current line and its adjacent ones and/or between the previous frame and a current frame stored in a frame memory 14. The separated signals are stored in frame memory 14 and at the same time are input to the display connector 15.

The display connector 15 converts the Y and C signals received from Y/C separator 13 into analog R, G and B signals and then outputs the converted signals to a display 16 which is, for example, a picture tube.

Tuner 11, channel demodulator 12, Y/C separator 13 correspond to an analog television signal processor 100. In addition, an analog-to-digital converter can be included for converting the output of channel demodulator 12 into digital form in order to store it in frame memory 14 as digital data, and a digital-to-analog converter for converting the output of display connector 15 into analog form in order to display it as an analog signal on display 16.

When a comb filter is used for the Y/C separation in a conventional analog television, a cross color or cross luminance phenomenon occurs due to insufficient Y/C separation. Accordingly, as shown in the circuit of FIG. 1, a frame memory is used for three-dimensional Y/C separation often noted as frame comb filtering, to enhance picture quality.

Frame memory 14 may be also used for post-processing, for further enhancement of the picture quality after the Y/C separation. That is, edge components determined by the correlation between a current frame and a previous frame using frame memory 14, are emphasized. Most such methods for enhancing picture quality require a costly high-capacity memory. Therefore, a method incorporating a limited memory is generally used, even though it is not as effective.

FIG. 2 is a schematic block diagram of a conventional digital television for receiving television signals coded by MPEG-2. In FIG. 2, a tuner 21 selects a desired channel signal from television signals received from an antenna. The television signals received from the antenna are input in an MPEG-2 packet structure.

According to an MPEG-2 format, the transmitting data has a system layer structure consisting of packets of a 188-byte unit. The packet structure includes a header having sync and side information and another region having audio data, video data and user data. The video data is compressed by an inter-picture encoding or intra-picture encoding technique. During the inter-picture encoding of predicted- and bi-directionally predicted picture data within each group of pictures (GOP) unit (fifteen pictures maximum) following an intra-picture, only the differences between the picture being encoded and another picture are encoded. Each GOP includes intra-picture data which can be independently coded without reference to any other picture data, predicted-picture data which can be coded from the preceding intra-picture data and the preceding predicted- pictures data by using motion compensation between adjacent pictures, and bi-directionally predicted picture data which can be coded from a preceding intra- or predicted- picture data and the following intra- or predicted-picture data, using motion compensation, between adjacent pictures.

A channel demodulator 22 including a quadrature phase shift-keying demodulator, a Reed-Solomon decoder and a Viterbi decoder, converts a desired digital television channel signal which is output from tuner 21, into an MPEG-2 bitstream.

A system decoder 23 separates the MPEG-2 bitstream into audio and video data streams. (As in the case of FIG. 1, the audio portion will not be described, though it is assumed that an audio decoder and audio signal processor are provided for decoding and signal-processing the audio stream, and only the video signal process is shown and will be described).

A video decoder 24 includes a variable-length decoder for variable-length-decoding the video data stream output from system decoder 23, an inverse quantizer for inverse quantizing the variable-length-decoded data, an inverse discrete cosine transform (IDCT) operator for performing IDCT operation, and motion compensator for computing motion-predicted data. Video decoder 24 reconstructs the compressed data in order to display the original data on a display 27. The reconstructed video is converted into an analog RGB signal by display connector 26 before being displayed on display 27.

A memory 25 is used for video-decoding, i.e., source-decoding, the digital video data performed in video decoder 24.

Memory 25 includes a video buffering verifier (VBV) buffer (also call a channel buffer) for converting the constant bit rate of the video data stream output from system decoder 23 into a variable bit rate before variable-length-decoding, and frame buffers for reconstructing the predicted and bi-directionally predicted pictures after compensating for motion by adding block data obtained by reading out a predetermined size of DCT blocks corresponding to a motion vector from previous frame data and inverse-DCT data. Accordingly, memory 25 requires a capacity of 8 Mb to 32 Mb for the frames and VBV buffers in order to decode the video data stream.

Tuner 21, channel demodulator 22, system decoder 23 and video decoder 24 correspond to a digital television signal processor 200. Further, the combination of digital television signal processor 200 and memory 25 is generally called a set top box (STB).

Since it is expected that the analog TV service such as NTSC, PAL will continue to exist, a consumer television system must have capability to display both analog and digital video services. Two methods therefor will be described as follows.

Referring to FIG. 3, all processes for digital video service are performed in an STB 210 and then the reconstructed video signal is applied to a video input terminal of a conventional analog television 110. Accordingly, digital video service can be received in the analog television 110 also.

Referring to FIG. 4, a television having a conventional analog video mode is provided with the digital television signal processor 200 and the memory 25, to thereby receive both analog video service and digital video service.

Accordingly, as shown in FIGS. 3 and 4, the memory is used for analog television signal processing, i.e., Y/C separation and post-processing, and an 8–32 Mb memory is used for decoding of digital video. When a television receives only analog video service, the memory of an 8–32 Mb for digital video-decoding is not used. It is thus inefficient because an existing resource within the television system cannot be used.

SUMMARY OF THE INVENTION

Accordingly, it is an object of the present invention to provide a receiver having analog and digital video modes, wherein a memory required for digital video signal decoding is commonly used for analog television signal processing in an analog video mode.

It is another object of the present invention to provide a receiving method wherein a memory required for decoding a digital video signal is commonly used for analog television signal processing in an analog video mode.

To accomplish the first object of the present invention, there is provided a receiver having an analog video mode for receiving a television signal analog-processed by a predetermined analog broadcasting method and a digital video mode for receiving a television signal digital-processed by a predetermined digital signal format, comprising: first signal processing means for processing the received analog television signal; second signal processing means for decoding the received digital television signal; a memory for storing data in order to decode the digital TV signal in the second signal processing means and process digitized analog television signal in the first signal processing means; generating means for generating a mode selection signal which represents either the analog video mode or the digital video mode; and a memory controller for controlling the memory according to the mode selection signal in order to write/read the signal processed in the first signal processing means to/from the memory during the analog video mode and write/read the digital TV signal to/from said memory during the digital video mode.

To accomplish the second object of the present invention, there is provided a method for receiving a television signal analog-processed by a predetermined analog broadcasting method and a television signal digital-processed by a predetermined digital signal format, comprising the steps of: (a) generating a mode selection signal which represents either analog video mode or digital video mode; (b) storing received digital television signal according to the mode selection signal in a memory for digital video-decoding and decoding using the data stored in the memory in digital video mode, and storing the received analog television signal in the memory for digital video-decoding and reading the data stored in the memory to process the data in the memory in analog video mode.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENTS

Figure 1:
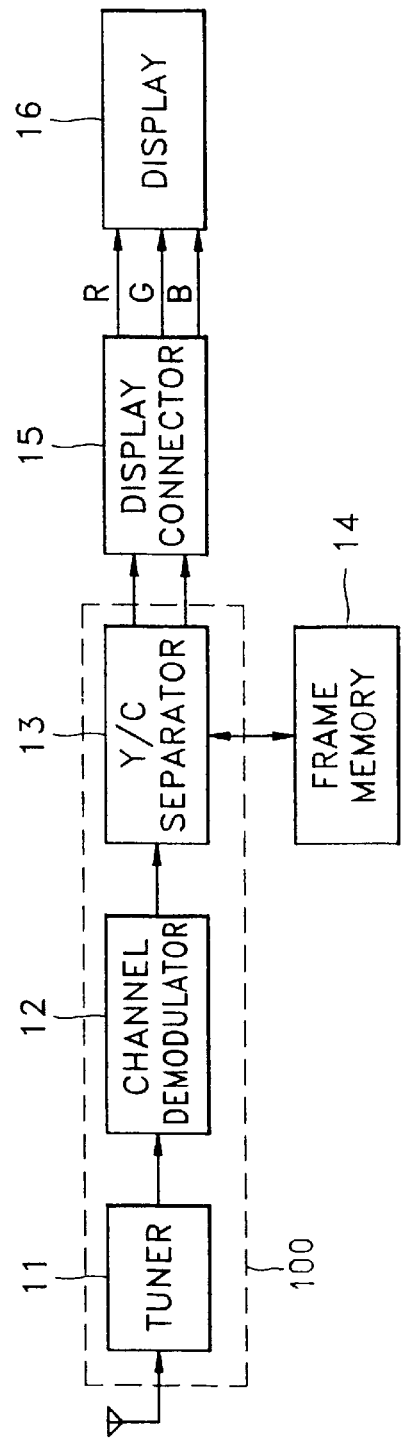
FIG. 1 is a block diagram of a conventional analog television.
Figure 2:
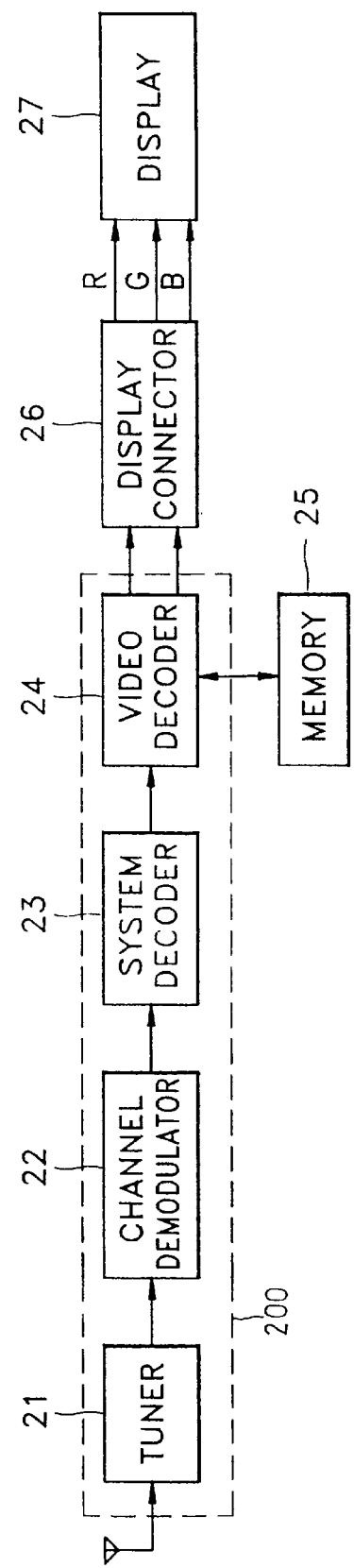
FIG. 2 is a block diagram of a conventional digital television.
Figure 3:
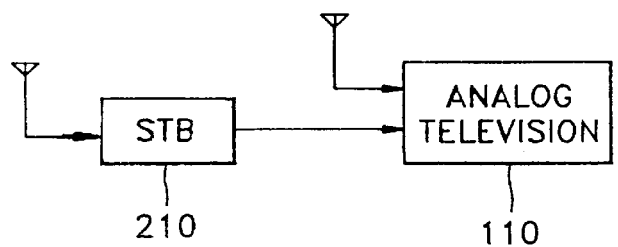
FIG. 3 is a schematic diagram of the conventional analog television with STB.
Figure 4:
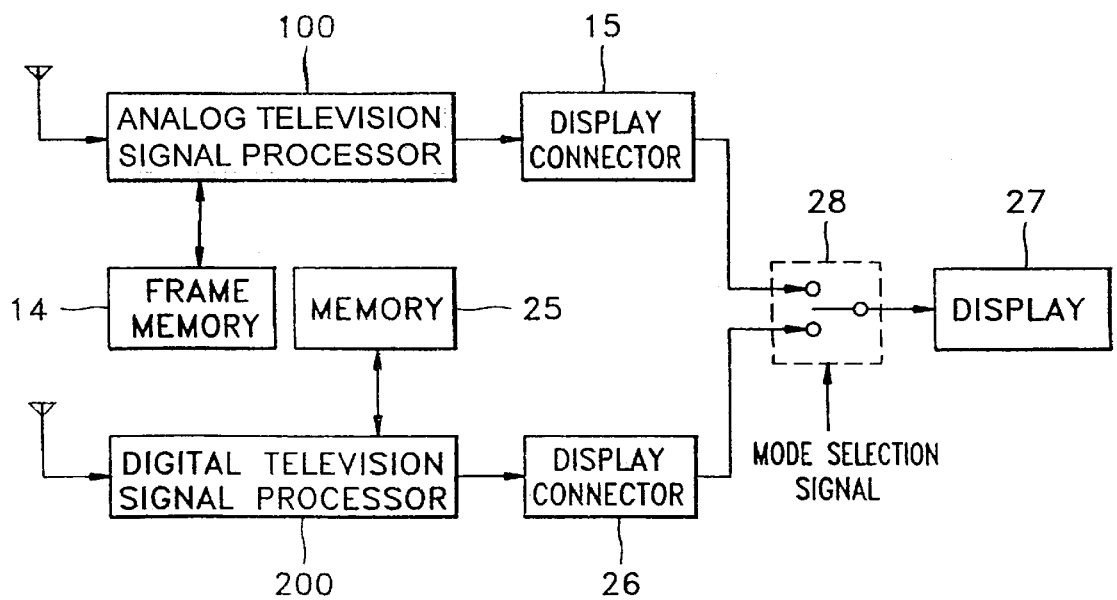
FIG. 4 is a schematic diagram of a digital television having a conventional analog video mode.
Figure 5:
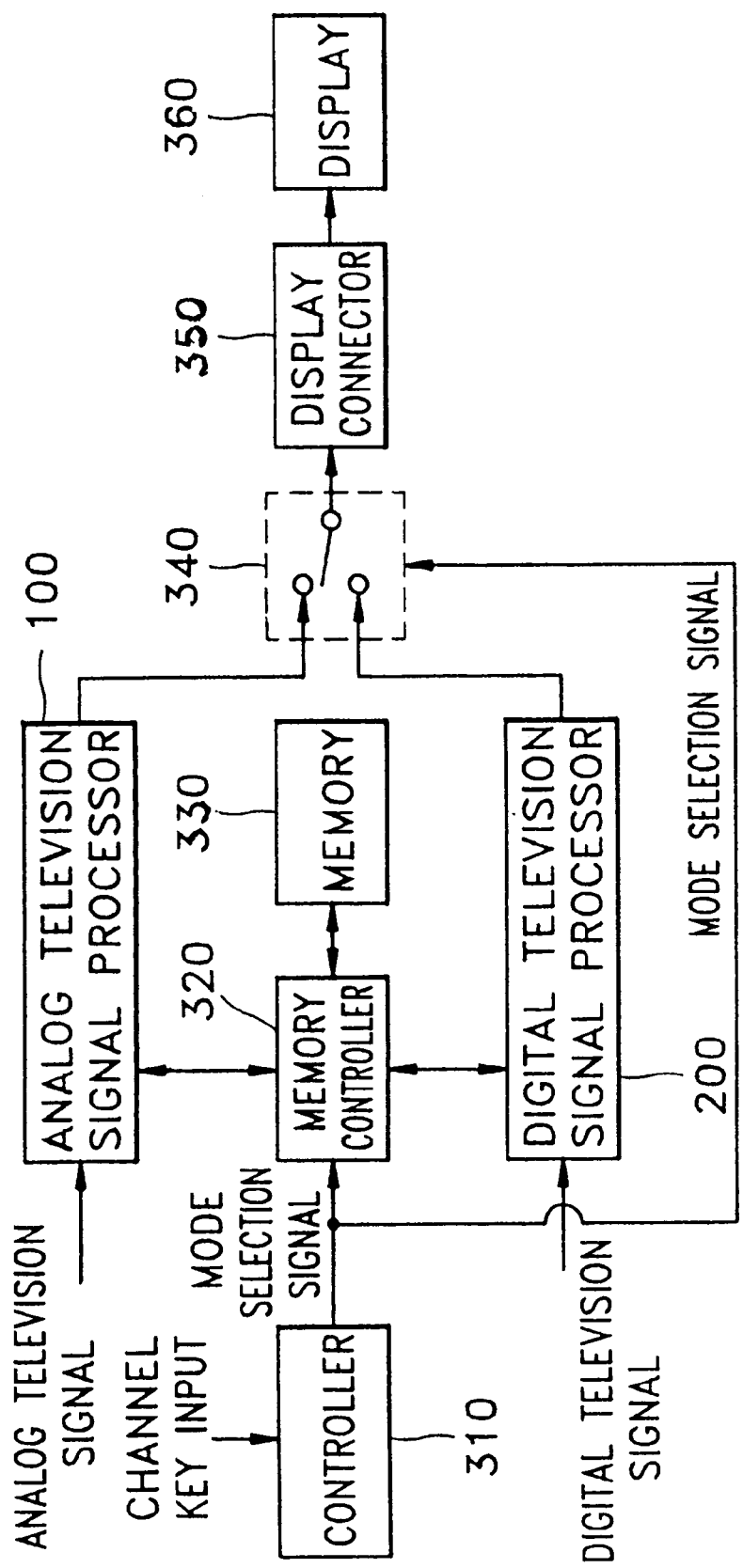
FIG. 5 is a block diagram of a receiver having analog and digital video modes according to a first embodiment of the present invention.

The structure and operation of the analog and digital television signal processors 100 and 200 in FIG. 5 are the same as those in FIGS. 1 and 2. Therefore, no further description will be given.

Referring to FIG. 5, a controller 310 determines whether an input channel key is a television channel processed by a conventional analog method (an analog television channel) or a television channel digitally encoded by MPEG-2 (a digital television channel), and outputs to a memory controller 320 a mode selection signal for either an analog or digital video mode. According to the mode selection signal, memory controller 320 selects one output among those processed in analog television signal processor 100 and digital television signal processor 200, to store the selected output in a memory 330, or read the data stored in memory 330 to supply the data to either analog television signal processor 100 or digital television signal processor 200.

In the analog video mode, the signal processed in analog television signal processor 100 is displayed on a display 360 through a multiplexer 340 and a display connector 360, and in the digital video mode, the signal processed in digital television signal processor 200 is displayed on display 360 through multiplexer 340 and display connector 350.

Multiplexer 340 supplies the video signal selected according to a mode selection signal output from controller 310 to display connector 350.

In the analog video mode, memory 330 is used as the frame memory (or a field memory) for the Y/C separation and post-processing as described referring to FIG. 1. In the digital video service mode, on the other hand, memory 330 is used as the VBV buffer for converting the transmission rate and as the frame buffer for motion compensation, as described referring to FIG. 2.

Figure 6:
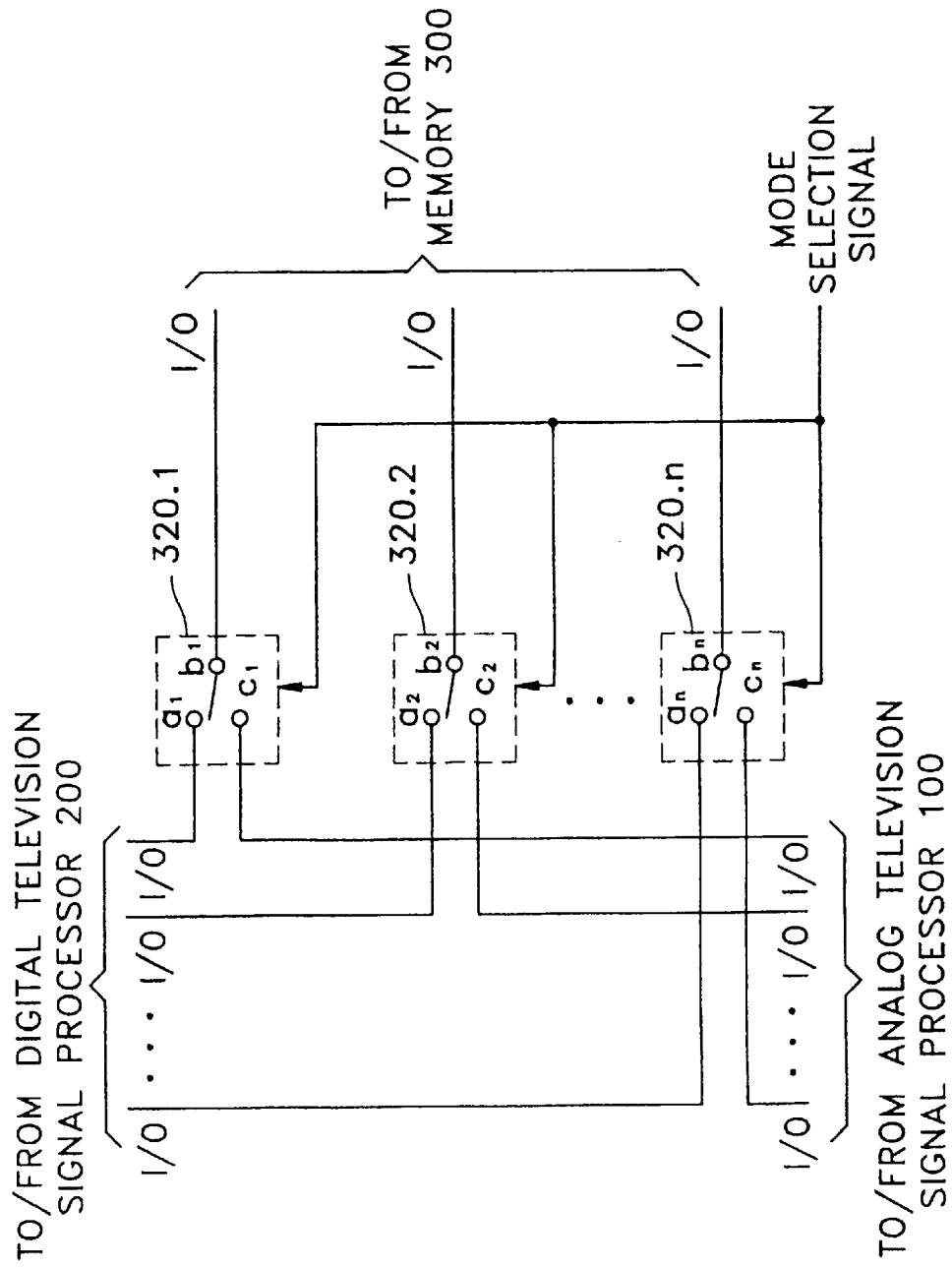
FIG. 6 is a detail view of the memory controller shown in FIG. 5.

FIG. 6 is a detailed view of the memory controller 320 shown in FIG. 5.

Referring to FIG. 6, input and output lines include a data line for reading or writing data to and from memory 330, an address line and a memory control line such as an enable.

The memory controller 320 includes a plurality of multiplexers 320.1–320.$n$ for switching, wherein first input terminals a1-an of each multiplexer are respectively connected to the input/output (I/O) lines of the digital television signal processor 200, second input terminals c1-cn are respectively connected to the I/O lines of the analog television signal processor 100, and fix terminals $b_1$–$b_n$, are respectively connected to the I/O lines of memory 330.

Accordingly, input and output lines of memory 330 are connected to input and output lines of the analog television signal processor 100 when the mode selection signal indicates the analog video mode, in order to use memory 330 as a frame buffer for Y/C separation and post-processing. Conversely, input and output lines of memory 330 are connected to input and output lines of the digital television signal processor 200 when the mode selection signal indicates the digital video mode, in order to use memory 330 as the VBV buffer for converting transmission rate and as the frame buffer for motion compensation.

Figure 7:
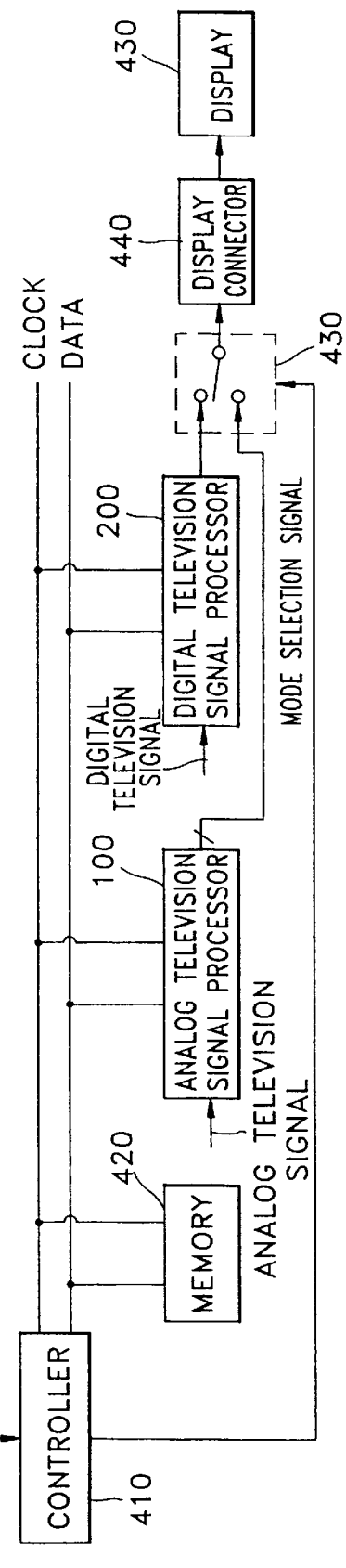
FIG. 7 is a block diagram of the receiver having analog and digital video modes according to a second embodiment of the present invention.

In FIG. 7, a receiver sharing a memory for both analog and digital modes using a bus-control method, is shown.

In the bus-control method, function control portions are connected to a controller 410 (microcomputer) through two common bus lines, i.e., data and clock lines, which allow bi-directional data transmission and are connected to a data output terminal or terminals and a clock output terminal of the controller. When the controller 410 transmits an address and data over the bus lines and the transmitted address corresponds to that of a given function control unit. The address function control unit is operated in accordance with the transmitted data. Accordingly, the bus-control method reduces the burden of the controller and decreases signal-processing time.

Referring to FIG. 7, a controller 410 determines whether an input channel key is an analog television channel or a digital television channel. When the selected channel is an analog television channel, controller 410 transmits the corresponding mode selection data via the data line to analog television signal processor 100 and a memory 420 in order to operate analog television signal processor 100 and memory 420. When the selected channel is a digital television channel, controller 410 transmits the corresponding mode selection data via the data line to digital television signal processor 200 and memory 420 in order to operate digital television signal processor 200 and memory 420.

Memory 420 is used as the frame memory for the Y/C separation and post-processing when the analog video mode is selected, where current frame data processed in analog television signal processor 100 is written in memory 420 through data lines, and previous frame data stored in memory 420 is transmitted to analog television signal processor 100 through the data lines. Memory 420 is also used as the VBV buffer for transmission rate conversion and as the frame buffer for motion compensation when the digital video mode is selected, where data processed in digital television signal processor 200 is stored in memory 420 through the data lines, and previous data stored in memory 420 is transmitted to digital television signal processor 200 through the data lines.

Signals processed in the analog television signal processor 100 and the digital television signal processor 200 according to the mode selection signal output from controller 410, are switched by multiplexer 430 and then displayed on a display 450 through a display connector 440.

Figure 8:
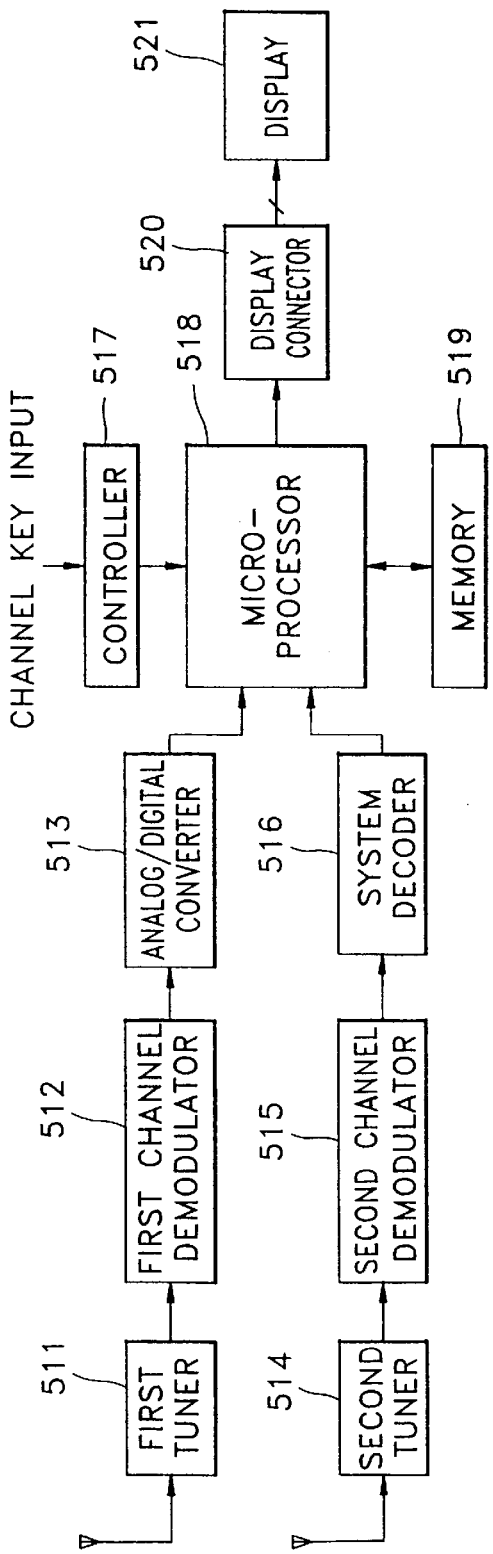
FIG. 8 is a block diagram of the receiver having analog and digital video modes according to a third embodiment of the present invention.

FIG. 8 is a block diagram of the receiver having analog and digital video modes according to a third embodiment of the present invention. The function of the memory controller consisting of hardware in FIG. 5, that is, the function of selecting analog television signal processor 100 or digital television signal processor 200 according to the mode selection signal, is programmed, and a memory 519 is alternately used for digital video-decoding and analog television signal processing such as Y/C separation and post-processing.

Referring to FIG. 8, a first tuner 511 selects only a desired channel signal among analog television channel signals transmitted through an antenna for receiving analog television channels, to output an intermediate frequency signal.

A first channel demodulator 512 amplifies the intermediate frequency signal of the channel selected from the first tuner 511, and outputs a video signal.

An analog-to-digital converter 513 converts the video signal output from the first channel demodulator 512 into digital form.

Meanwhile, a second tuner 514 selects a desired channel signal among digital television channel signals coded according to MPEG-2 and transmitted through an antenna for receiving digital television channels. A second channel demodulator 515 outputs the desired digital television channel signal output from second tuner 514 as an MPEG-2 bitstream, and a system decoder 516 extracts only a video data stream from the MPEG-2 bitstream.

A controller 517 determines whether the input channel key is an analog television channel or a digital television channel in order to output a mode selection signal indicating the proper mode, i.e., the analog video mode or the digital video mode.

A microprocessor 518 receives the mode selection signal to select either the output of the analog-to-digital converter 513 connected to a first input port or the output of the system decoder 516 connected to a second input port. That is, in an analog video mode, microprocessor 518 selects a digitized analog television channel signal output from the analog-to-digital converter 513, and then either writes in a memory 519 or reads from memory 519 using the instructions of a predetermined program, to perform Y/C separation and post-processing. Here, memory 519 is used as a frame memory for the Y/C separation and post-processing.

As shown in FIG. 8, in addition to having signals received using first and second input ports of the microprocessor 518, a multiplexer can be connected to an input port to switch the two inputs in order to use only one input port of the microprocessor 518. The above modifications can be used for embodiments of FIGS. 9A through 9C, FIG. 10 and FIGS. 12A through 12C.

Meanwhile, a display connector 520 converts digital data output from microprocessor 518 into analog form, to display analog R, G and B signals on display 521. The display connector can be called a signal converter.

The microprocessor 518 can calculate at a high speed, but a specific function such as inverse DCT which requires high-speed operation can be realized by hardware.

Figure 9A:
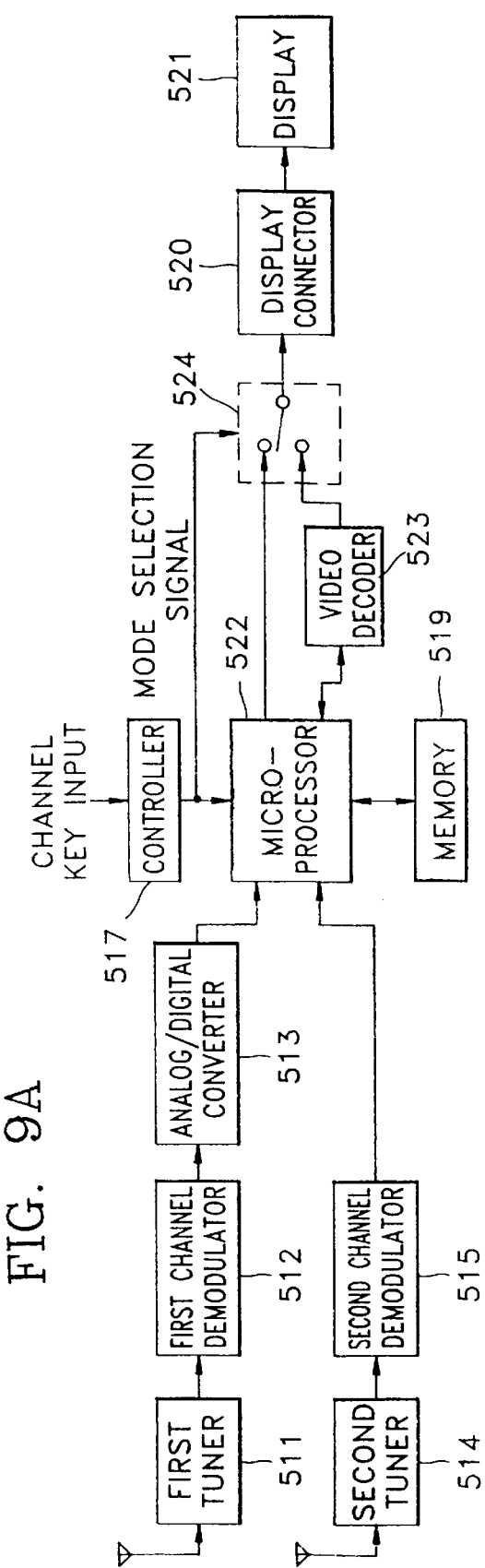
FIGS. 9A through 9C illustrate modifications of the third embodiment shown in FIG. 8.
Figure 9B:
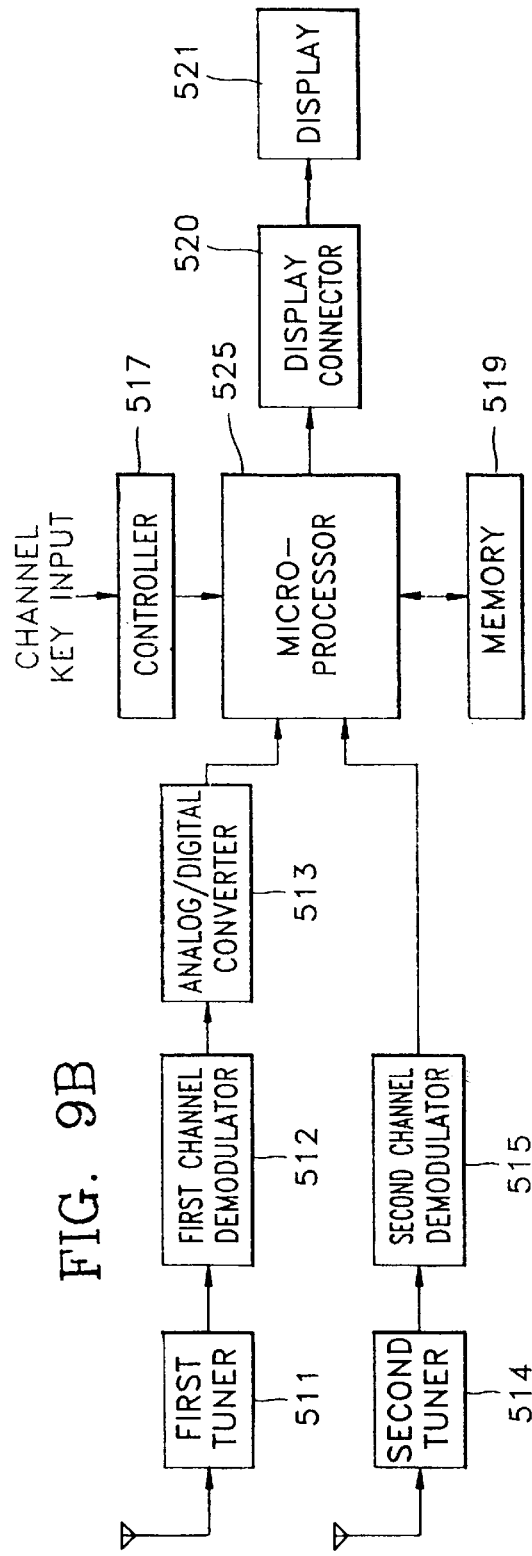
Figure 9C:
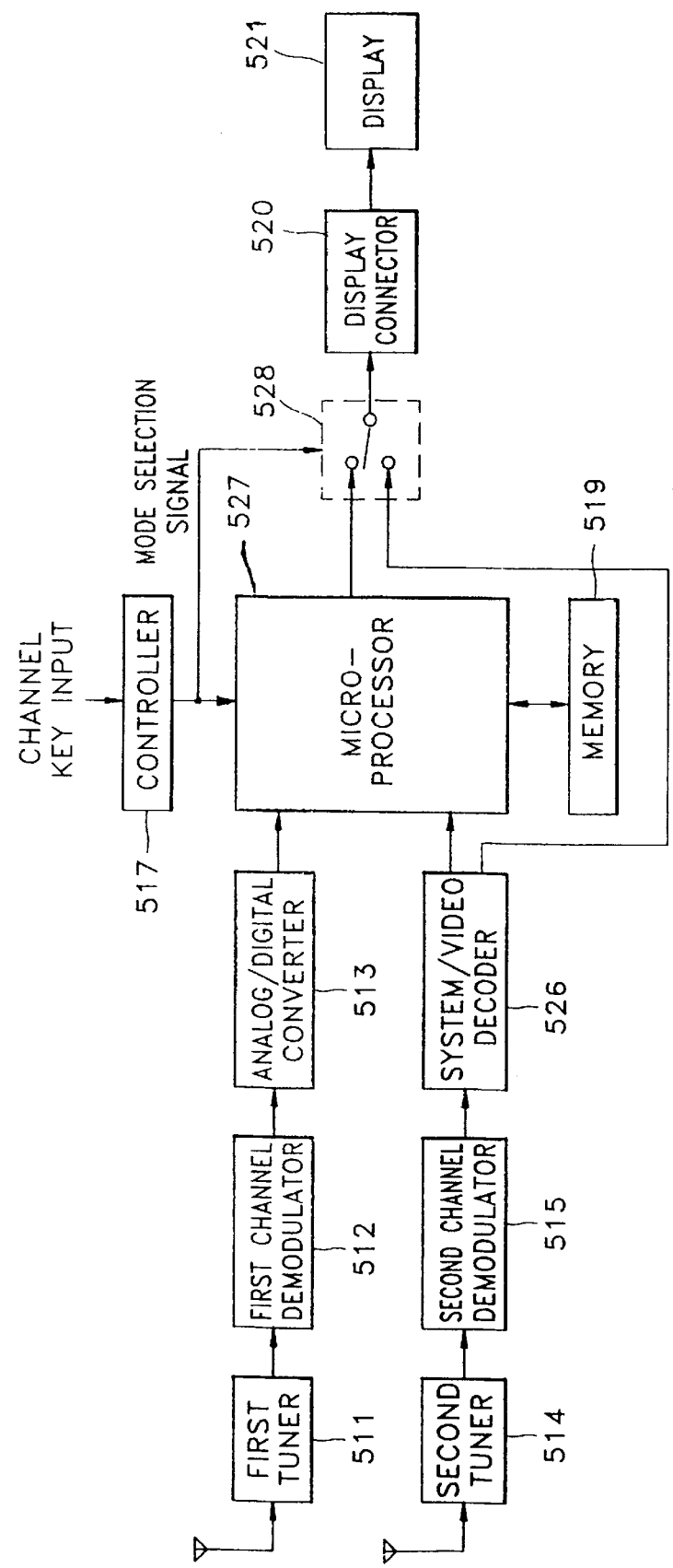

FIGS. 9A through 9C are modifications of the third embodiment shown in FIG. 8.

A microprocessor 522 shown in FIG. 9A, receives a digitized analog television channel signal which is output from analog-to-digital converter 513 in analog video mode, to thereby perform Y/C separation and post-processing using memory 519 as described in FIG. 8.

Also, microprocessor 522 receives a MPEG-2 bitstream from second channel demodulator 515 in digital video mode and then a video data stream is extracted from MPEG-2 bitstream under control of controller 517 and output to a video decoder 523. Video decoder 523 reconstructs video data stream from the extracted video data stream.

The microprocessor 522 provides a memory connection path so that video decoder 523 uses memory 519 as a VBV buffer, a frame buffer and a display buffer.

A multiplexer 524 selects one of digitized analog signals, which are output from microprocessor 522 according to the mode selection signal output from controller 517 and reconstructed data in video decoder 523.

A microprocessor 525 shown in FIG. 9B performs Y/C separation and post-processing in analog video mode as described in FIG. 9A, and MPEG-2 system decoding and video-decoding in digital video mode. That is, in the case of digital video mode, a video data stream is extracted from MPEG-2 bitstream output from the second channel demodulator 515 and then video data is reconstructed from the extracted video data stream by microprocessor 525.

A microprocessor 527 shown in FIG. 9C performs a memory control function for sharing memory 519 in analog mode and digital video mode and Y/C separation and post-processing in analog mode as described in FIGS. 9A and 9B.

Meanwhile, in digital video mode, MPEG-2 system decoding and video-decoding are performed by a system and video decoder 526. Also, a multiplexer 528 supplies one of digitized analog signals output from microprocessor 527 according to the mode selection signal of controller 517 and reconstructed video data output from system and video decoder 526, to display connector 520.

Figure 10:
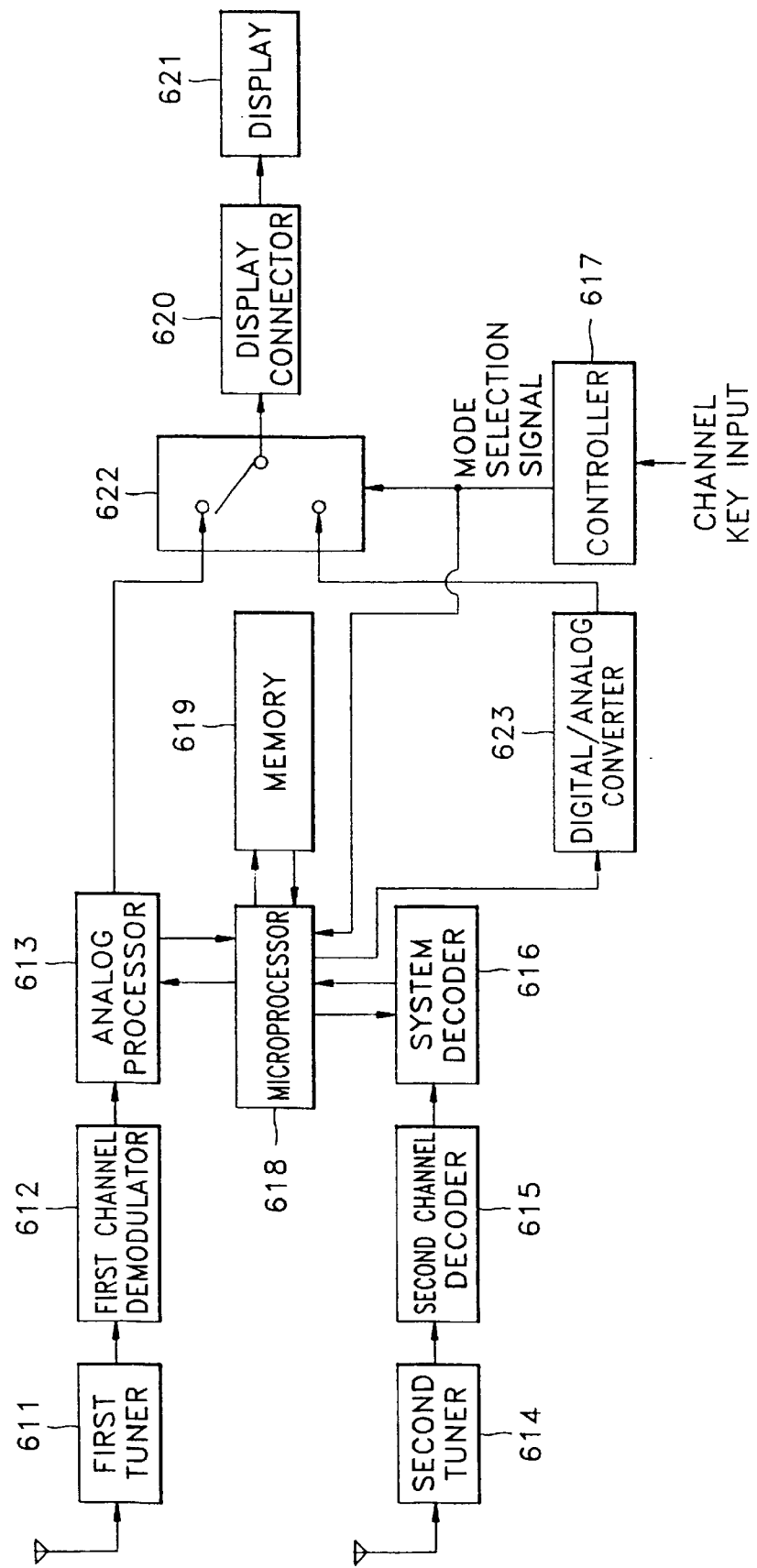
FIG. 10 is a block diagram of the receiver having analog and digital video modes according to a fourth embodiment of the present invention.

FIG. 10 is a block diagram of a receiver having analog and digital video modes according to a fourth embodiment of the present invention. Here, operation of a first tuner 611, a first channel demodulator 612, a second tuner 614, a second channel demodulator 615, a system decoder 616, a display connector 620 and a display 621 is the same as that described in FIG. 8.

Figure 11:
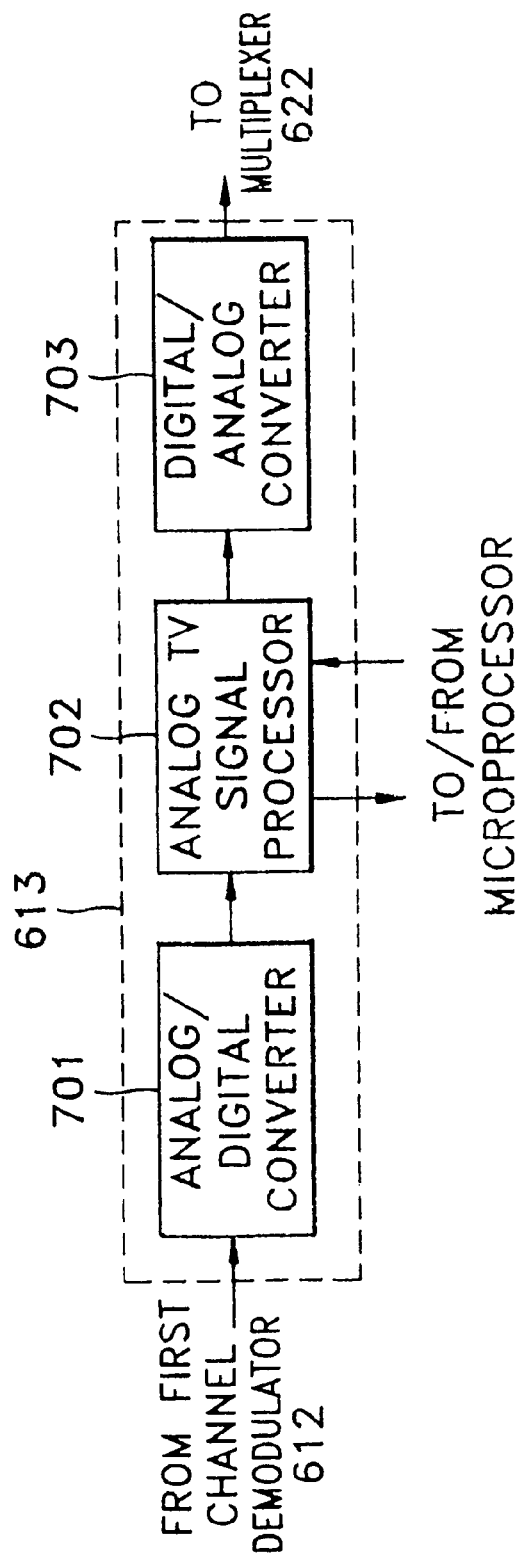
FIG. 11 is a detail block diagram of an analog processor shown in FIG. 10.

In the third embodiment shown in FIG. 8, the memory control function is programmed into a microprocessor 618. However, in the fourth embodiment, the analog television signal processing such as three-dimensional Y/C separation or post-processing is analog processor 613 separated from microprocessor 618. Analog processor 613 is provided with an A/D converter 701, an analog TV signal processor 702 and a D/A converter 703, as shown in FIG. 11.

In A/D converter 701, the channel demodulated signal output from first channel demodulator 612 of FIG. 10 is converted into digital data. The digital data is then received by an analog TV signal processor 702 and further stored in a memory 619 through microprocessor 618 operated as a memory controller. The analog TV signal stored in memory 619 is used by the analog TV signal processor 702 for Y/C separation or post-processing. The output processed by the analog TV signal processor 702 is temporarily stored in memory 619 until being read out, and is converted into analog signal in D/A converter 703.

Meanwhile, in case of digital video service, MPEG-2 bitstream is decoded into a video data stream in the system decoder 616 and the video data stream is reconstructed to video data by microprocessor 618. The reconstructed data is converted into analog signal by the D/A converter 623.

According to the mode selection signal output from the controller 617 where a mode is determined by a received channel key, a multiplexer 622 selects an analog TV signal processed in the analog processor 613 or an analog video signal output from the D/A converter 623.

The display connector 620 of FIG. 10 receives data converted into analog signal and then converts the data into R, G and B signals, to thereby output the R, G and B signals to display 621. In a modification thereof, display connector 620 can be realized by uniting one of components of analog processor 613, i.e., a digital-to-analog converter 703 and digital-to-analog converter 623. Here, the multiplexer 622 converts received digital signals into analog signals, and then outputs analog R, G and B signals into display 621. The above modification is applied to FIGS. 12A, 12B and 12C.

Meanwhile, the embodiment of FIG. 10 can be slightly modified depending on the extent of implementing MPEG decoding by software using the microprocessor 618.

Figure 12A:
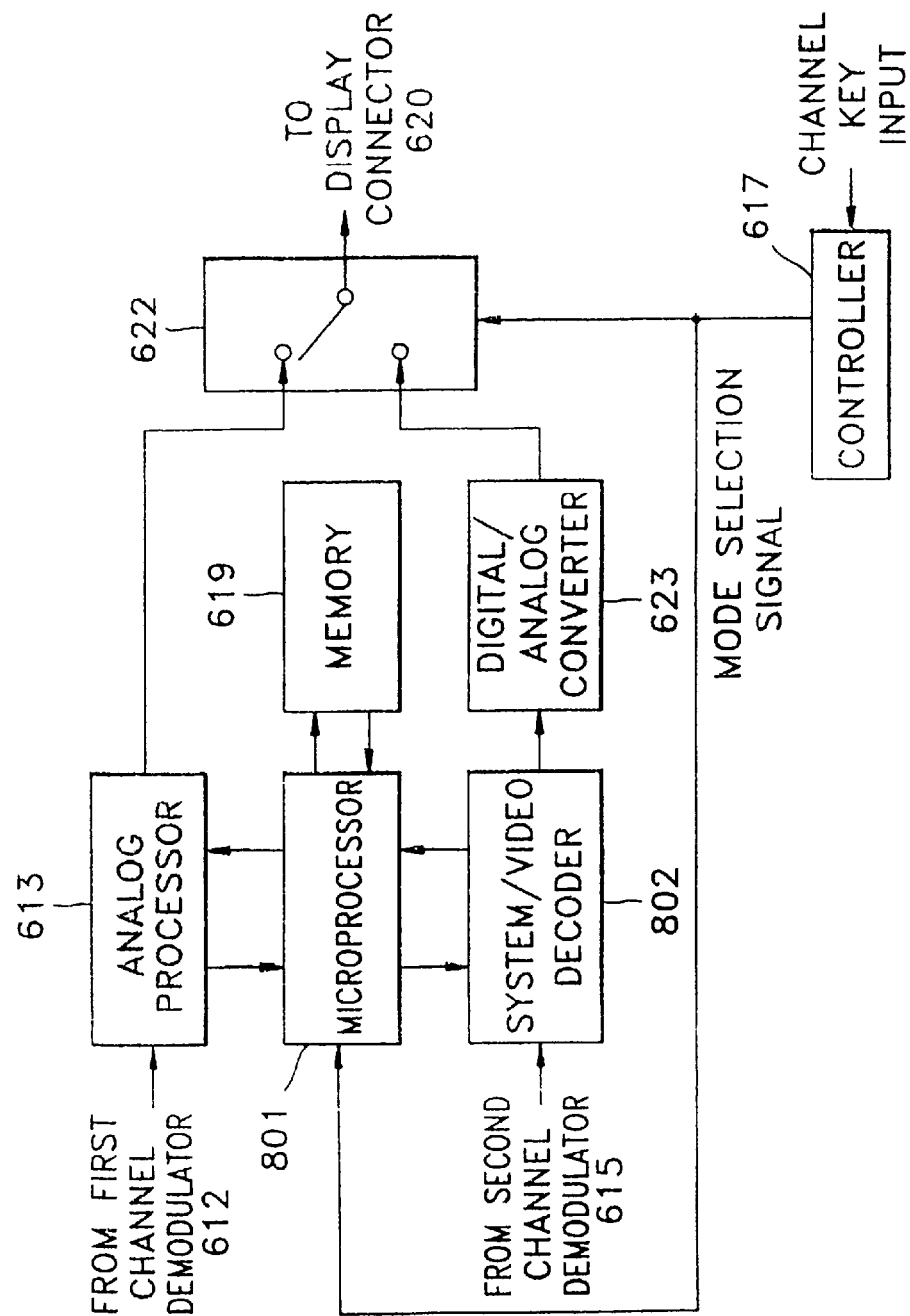
FIGS. 12A through 12C are modifications of the fourth embodiment shown in FIG. 10.
Figure 12B:
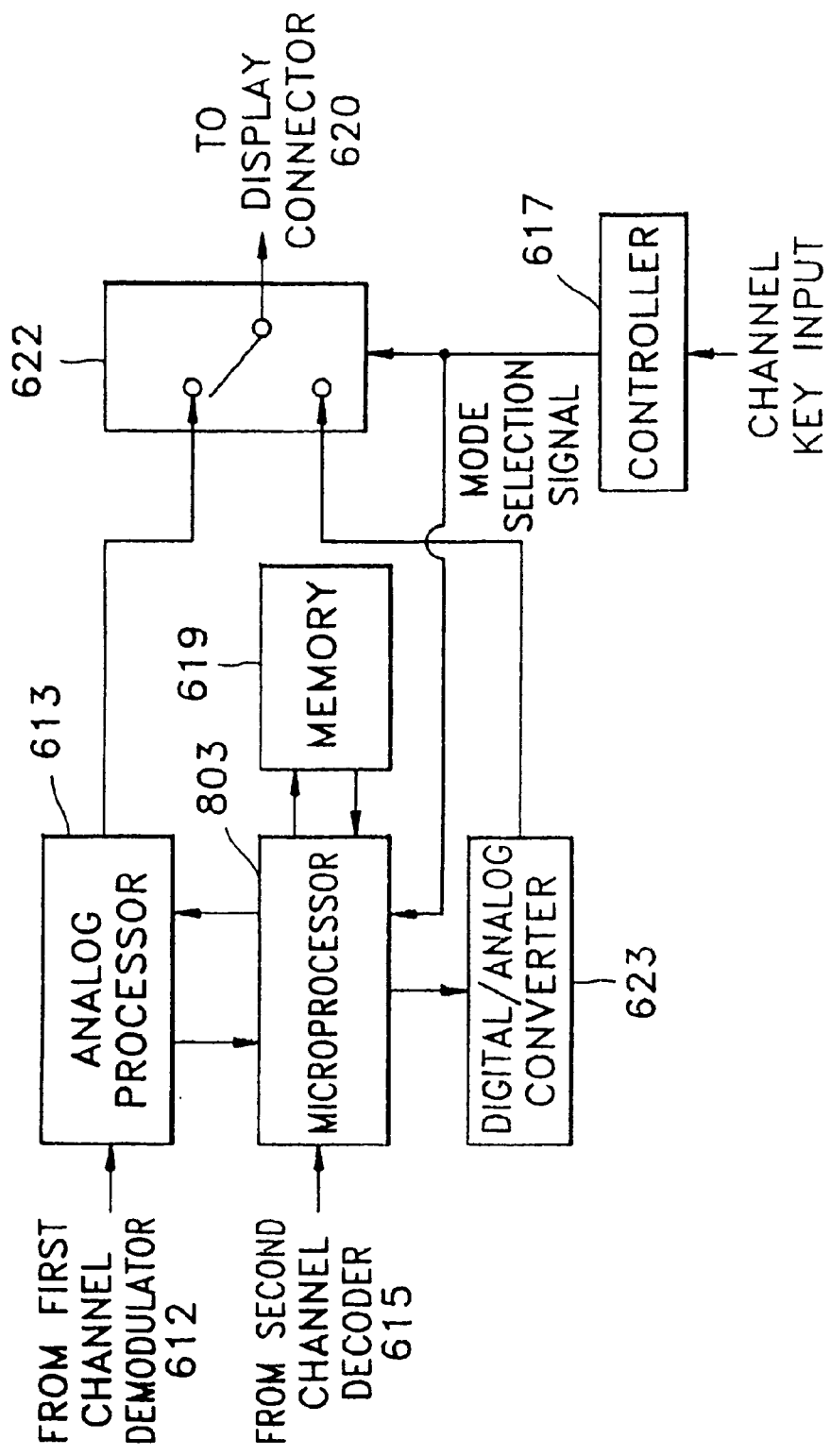
Figure 12C:
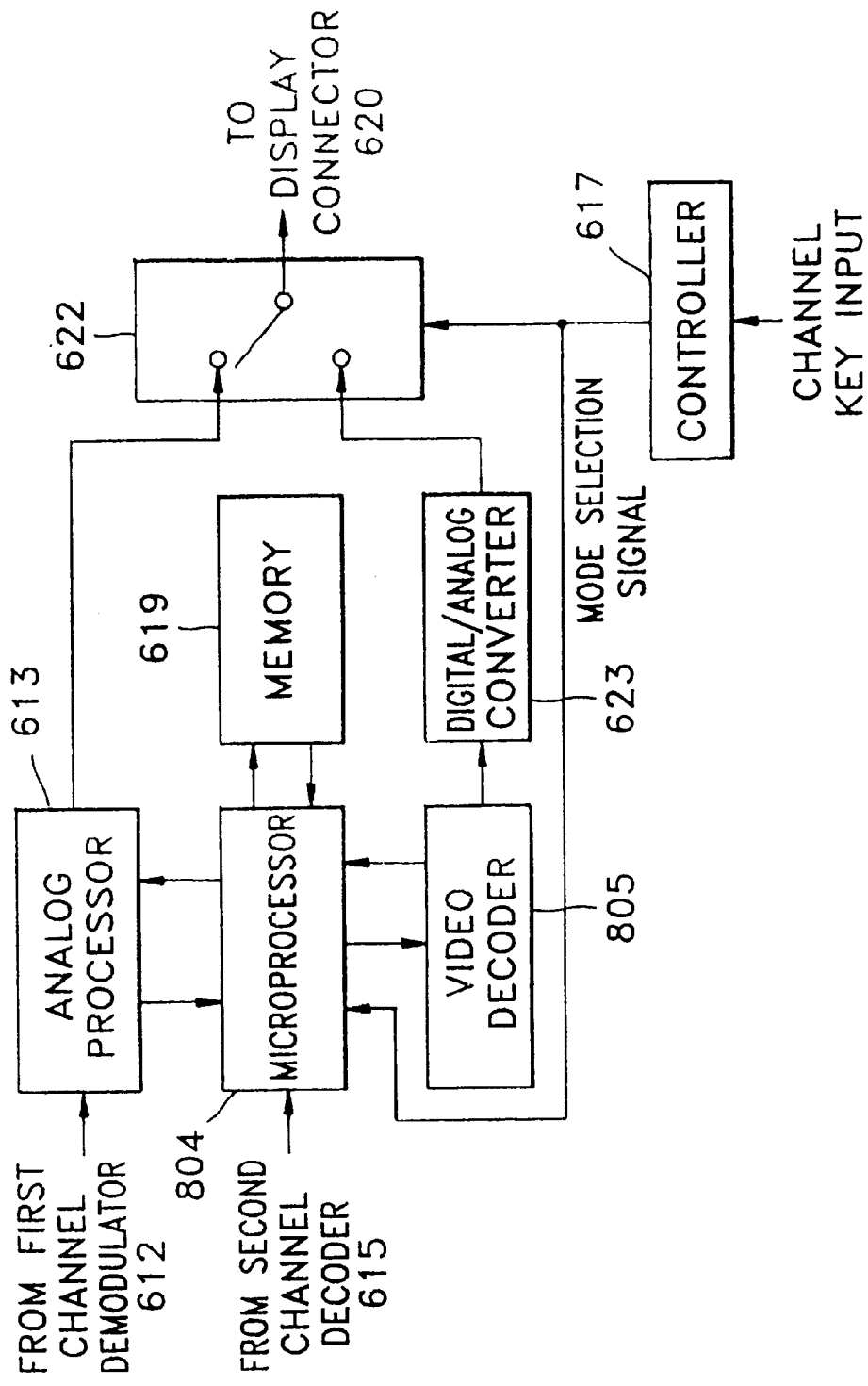

FIGS. 12A through 12C are modifications of the fourth embodiment shown in FIG. 10, where functionally identical portions are given by the same reference numerals as those of FIG. 10.

The microprocessor 801 shown in FIG. 12A performs only control of the memory 619. The MPEG-2 bitstream decoding and video data stream decoding are performed by a system and video decoder 802 outside of the microprocessor 801.

A microprocessor 803 shown in FIG. 12B performs both MPEG-2 bitstream decoding and video data stream decoding.

A microprocessor 804 shown in FIG. 12C performs MPEG-2 bitstream decoding. However, video data stream decoding is performed by a video decoder 805 external to the microprocessor 804.

According to the present invention, when a receiver for receiving both analog video service and digital video service processes a received analog television channel, a large-capacity memory (as that for digital video decoding) is commonly used as a memory for processing an analog television signal, so that memory efficiency is enhanced and system cost is reduced.

What is claimed is:

1. A receiver having an analog video mode for receiving television signals analog-processed by a predetermined analog broadcasting method and a digital video mode for receiving television signals digitally processed by a predetermined digital signal format, comprising:

controlling means connected to common bus lines including at least one data line and a clock line for generating mode selection data which represents one of said analog video mode and said digital video mode;

first signal processing means connected to said common bus lines, for signal-processing an analog television signal according to the mode selection data;

second signal processing means connected to said common bus lines, for decoding a digital television signal according to the mode selection data; and a memory connected to said common bus lines, for decoding the digital television signal from said second signal processing means, storing data processed in said first signal processing means according to said mode selection data for representing said analog video mode, and for supplying stored data to said first signal processing means.

2. The receiver according to claim 1, wherein said first signal processing means comprises:

a first tuner for selecting a channel among received analog television channels, to output an intermediate frequency signal;

a first channel demodulator for amplifying and demodulating said intermediate frequency signal of the channel selected by said first tuner to output a video signal; and a luminance/chrominance separator for separating said video signal output from said first channel demodulator into a luminance (Y) signal and a chrominance (C) signal using correlation between adjacent pictures stored in said memory and between adjacent lines stored in said memory.

3. The receiver according to claim 2, further comprising a post-processor for post-processing said luminance signal for enhancing picture quality.

4. The receiver according to claim 2, wherein, in said analog video mode, said memory is used as a frame memory for storing data output from said first channel demodulator in a picture unit and data input from said post-processor in a picture unit.

5. The receiver according to claim 2, wherein, in said analog video mode, said memory is used as a frame memory for storing data output from said first channel demodulator in a picture unit.

6. The receiver according to claim 1, wherein said first signal processing means comprises:

a first tuner for selecting a channel among received analog television channels, to output an intermediate frequency signal;

a first channel demodulator for amplifying and demodulating said intermediate frequency signal of the channel selected by said first tuner and for outputting a video signal; and a post-processor for post-processing using said video signal output from said first channel demodulator and data stored in said memory.

7. The receiver according to claim 6, wherein, in said analog video mode, said memory is used as a frame memory for storing data output from said first channel demodulator in a picture unit.

8. The receiver according to claim 1, wherein said second signal processing means comprises:

a second tuner for selecting a channel signal among received television signals coded by the digital signal format;

a second channel demodulator for channel-decoding the channel signal output from said second tuner;

a system decoder for outputting a video data stream from a channel-decoded signal output from said second channel demodulator; and a video decoder for reconstructing video data from said video data stream.

9. The receiver according to claim 8, wherein, in said digital video mode, said memory is used as a channel buffer for converting the transmission rate of a constant bit rate into a variable bit rate for video-decoding and as a frame buffer for motion compensation.

10. The receiver according to claim 1, further comprising:

switching means for selecting one of the output signals from said first signal processing means and said second signal processing means according to said mode selection data; and display control means for displaying the signal selected by said switching means on a display.

* * * * *